United States Patent [19]
Hamilton, II et al.

[11] Patent Number: 5,878,377
[45] Date of Patent: Mar. 2, 1999

[54] ENVIRONMENTAL AND POWER ERROR HANDLING EXTENSION AND ANALYSIS

[75] Inventors: Rick Allen Hamilton, II, Austin; Steven Paul Hartman, Round Rock; Alongkorn Kitamorn, Austin, all of Tex.

[73] Assignee: International Business Machines Corporation, Armonk, N.Y.

[21] Appl. No.: 826,852

[22] Filed: Apr. 10, 1997

[51] Int. Cl.⁶ .................................................. G01Q 25/00
[52] U.S. Cl. .......................................... 702/132; 702/121
[58] Field of Search ............................. 364/551.01, 550, 364/552, 557, 579, 131; 340/500, 540, 584, 657; 702/116, 121, 122, 130–132

[56] References Cited

U.S. PATENT DOCUMENTS

| | | | |
|---|---|---|---|
| 4,600,962 | 7/1986 | Bliehall | 340/825.32 |
| 4,924,398 | 5/1990 | Fujiwara | 73/117.2 |
| 5,347,476 | 9/1994 | McBean, Sr. | 364/571.04 |
| 5,379,431 | 1/1995 | Lemon et al. | |
| 5,533,192 | 7/1996 | Hawley et al. | |
| 5,537,538 | 7/1996 | Bratt et al. | |
| 5,566,346 | 10/1996 | Andert et al. | |
| 5,574,915 | 11/1996 | Lemon et al. | |
| 5,598,395 | 1/1997 | Watanabe | 369/116 |
| 5,623,594 | 4/1997 | Swamy | 395/180 |

*Primary Examiner*—Louis Arana
*Assistant Examiner*—Craig Steven Miller
*Attorney, Agent, or Firm*—Matthew G. Reeves

[57] ABSTRACT

One aspect of the invention relates to an apparatus for detecting environmental faults in a computer system. In one version of the invention, the apparatus includes a means for measuring a physical parameter with a sensor coupled to the computer system, the sensor being associated with a sensor type and identification code; a means for transmitting a signal from the sensor to the computer system, the signal being responsive to the measurement; a means for determining whether an environmental fault condition exists by comparing the signal to a pre-determined threshold; means for determining an error type, identification code and sensor type; and a means for writing fault data to an environmental warning register, the fault data comprising the sensor type, identification code and error type.

18 Claims, 7 Drawing Sheets

EPOW check-exception RTAS Functional Description:

1) Read EPOW register byte 0 (ISA 0x855)

2) Data in EPOW-code field go to EPOW sensor value (low-order 4 bits of byte 12-15, extended error log EPOW format).

3) If the value in the EPOW code field (lower nibble of EPOW byte 0) is 5, RTAS should return value to O/S ASAP in order to meet 4ms timing requirement. Fill out the error log as per CHRP 1.0. Clear the EPOW register (writing 0x00) after read. There is no need to read ISA 0x854 or appending FRU location code.

4) If the value in the EPOW code field (lower nibble of EPOW byte 0) is NOT 5, read EPOW register byte 1 (ISA 0x854).

5) Log the FRU location code(s) using the information in EPOW byte 1 and high nibble of byte 0. The value of low nibble byte 0 are listed here for reference only.

| Byte-1 | Byte-0 | Location Code(s) |
|---|---|---|
| 00 | 45 | none |
| 00 | 85 | none |
| 1n | 11 | F (n+1) P2 |
| 1n | 64 | F (n+1) P2 |
| 2n | 32 | V1 P2 |
| 2n | 52 | V1 P2 |
| 3n | 21 | none |
| 3n | 73 | none |

Notes: n is the sensor ID.

6) Fill out the error log as per CHRP Extension 1.1. Append both EPOW registers value (byte 1 follow by byte 0) as product-specific log data, to the end of error log. Please refer to Architecture Note under CHRP extension requirement 14-12 for more detail.

7) Clear the EPOW registers (writing 0x00 to ISA 0x855 will clear both) after read.

FIG. 4

EPOW Error Log Analysis (ELA) Description:

ELA to be invoked automatically right after the EPOW error log is created by AIX O/S.
Warning message to be sent to system console as per the follow algorithm.

If error log byte 15 = 04 or 05 or 07, then
    no action to be taken by ELA, AIX EPOW handler will provide
    system shutdown message.
If error log byte 15 = 01 or 02 or 03, then
    read extended EPOW error definition (XEPOW)
        if XEPOW = 0x1n11, then        \*\*/ where n = sensor ID /\*\*
            display warning message to system console
            "A non-critical system cooling problem has been detected. Fan
            number (n+1) appears to be rotating slower than expected. Contact
            your service provider."
        if XEPOW = 0x3n21, then
            display warning message to system console
            "A non-critical system cooling problem has been detected. The system
            temperature appears to be above the expected range. Check for elevated
            room temperatures, restricted air flow around the system or open system
            inner/outer cover. If no problem is found, contact your service
            provider."
        if XEPOW = 0xn73, then
            display warning message to system console
            "A critical system cooling problem has been detected. The system
            will shut down because the system temperature appears to be above
            the allowable range. Check for elevated room temperatures, restricted
            air flow around the system or open system inner/outer cover. If no
            problem is found, contact your service provider."
        if XEPOW = 0x2n32 or 0x2n52, then
            display warning message to system console
            "A non-critical system power problem has been detected. One of
            the internal power supply voltages appears to be outside the
            normal operating range. Contact your service provider."

ELA also to be invoked manually by CE (Customer Engineer) to determine the failure
FRU (Field Replaceable Unit). The XEPOW error definitions and recommended
action(s) are as follow:

1n11:  Fan (n+1) is turning slower than expected.
       Replace the FRU in the order suggested by location code(s).
       1) Fan (n+1), 2) Fan speed sensor (n+1)
1n64:  Fan (n+1) stopped was detected.
       Verify that 1) there is no obstruction to fan (n+1) rotation,

FIG. 5A 2) the power connection to fan is tight, 3) the fan speed sensing cable is tight, 3) the fan speed sensing cable is tight. If the fan is not turning, replace fan (n+1). If the fan is turning, the suspected failure is the fan speed sense cable or the speed sensor. Replace the FRU in the order suggested by location code(s).
1) Fan (n+1), 2) Fan speed sensor (n+1)

2n32: An over voltage condition was detected.
Verify that all DC voltages are within the specification limit.
Replace the FRU in the order suggested by location code(s).
1) Power Supply, 2) Voltage sensor n 2n52: An under voltage condition was detected.
Verify that all DC voltages are within the specification limit.
Replace the FRU in the order suggested by location code(s).
1) Power Supply, 2) Voltage sensor n 3n21: An over temperature condition was detected.
Verify that: 1) The room ambience temperatures is within the system operating environment, 2) no restricted air flow around the system,
3) all system inner/outer covers are closed.
1) Temperature sensor n 3n73: The system was shutdown due to an "over maximum temperature condition" was detected.
Verify that: 1) The room ambience temperatures is within the system operating environment, 2) no restricted air flow around the system,
3) all system inner/outer covers are closed.
1) Temperature sensor n If no XEPOW value, read EPOW error log byte 15, B15 = 0x05: The system was shutdown due to: 1) Loss of AC power from wall outlet, 2) A failure within the power supply, 3) The power button was pushed without proper system shutdown procedure.
1) Power supply Note: n = sensor ID

FIG. 5B

| Table 34. Environmental and Power Warning Codes | | | | |
|---|---|---|---|---|
| Byte 1 | | Byte 0 | | Description |
| Sensor Type | Sensor ID | Error Type | Action Code | |
| 0x0 | 0x0 | 0x0 | 0x0 | Normal Operation |
| 0x0 | 0x0 | 0x0 | 0x1 | Cooling Alert |
| 0x1 | 0x0 | 0xn | 0x1 | Slow Fan; n is fan number; 1-4 for Wildcat |
| 0x3 | 0x1 | 0x2 | 0x1 | CPU Over Temperature alert |
| 0x3 | 0x2 | 0x2 | 0x1 | I/O Over Temperature alert |
| 0x0 | 0x0 | 0x0 | 0x2 | Power alert |
| 0x2 | 0x0 | 0x3 | 0x2 | +5V Over Voltage Alert |
| 0x2 | 0x0 | 0x5 | 0x2 | +5V Under Voltage Alert |
| 0x2 | 0x1 | 0x3 | 0x2 | +3.3V Over Voltage Alert |
| 0x2 | 0x1 | 0x5 | 0x2 | +3.3V Under Voltage Alert |
| 0x2 | 0x3 | 0x3 | 0x2 | +12V Over Voltage Alert |
| 0x2 | 0x3 | 0x5 | 0x2 | +12V Under Voltage Alert |
| 0x2 | 0x4 | 0x3 | 0x2 | -12V Over Voltage Alert |
| 0x2 | 0x4 | 0x5 | 0x2 | -12V Under Voltage Alert |
| 0x2 | 0x5 | 0x3 | 0x2 | +5V Standby Over Voltage Alert |
| 0x2 | 0x5 | 0x5 | 0x2 | +5V Standby Under Voltage Alert |
| 0x0 | 0x0 | 0x0 | 0x3 | Slow Shutdown Request |
| 0x3 | 0x1 | 0x7 | 0x3 | CPU Critical Over Temperature - Slow Shutdown Request |
| 0x3 | 0x2 | 0x7 | 0x3 | I/O Critical Over Temperature - Slow Shutdown Request |
| 0x0 | 0x0 | 0x0 | 0x4 | Fast Shutdown Request |
| 0x1 | 0xn | 0x6 | 0x4 | Locked Fan-Fast Shutdown Request; n is Fan number (1-4) |
| 0x0 | 0x0 | 0x0 | 0x5 | Power Loss |
| 0x2 | 0x0 | 0x4 | 0x5 | AC (outlet) - Power Loss |
| 0x2 | 0x0 | 0x8 | 0x5 | Power button request - Power Loss |

FIG. 7

ENVIRONMENTAL AND POWER ERROR HANDLING EXTENSION AND ANALYSIS

TECHNICAL FIELD

This invention relates generally to the field of computer systems, and more particularly, to techniques for detecting environmental and power problems which can have an adverse effect on the operation of the computer system. Still more particularly, the invention relates to a method and apparatus for generating environmental and power warnings and providing this information to computer service repair personnel for fast and accurate diagnosis and correction of environmental and power errors.

BACKGROUND OF THE INVENTION

Complex computer systems require stable environmental and power conditions to ensure proper operation. When site environmental problems occur, such as air conditioning malfunctions, restricted air flow around the computer system, a/c power glitches, etc., the computer system may not properly perform, resulting to injury to important data stored on the computer by logical damage, e.g., disk sectors data corruption, or even complete hardware malfunction.

Accordingly, many complex systems are provided with various sensors for detecting these types of environmental and power problems and providing appropriate error messages to inform users of these problems. Also, these error messages are used by computer repair service personnel to diagnose and correct the problem. One exemplary environmental and power warning system is provided in the PowerPC Common Hardware Reference Platform, ("CHRP") and RS/6000 Systems to inform the operating system of these types of events. The Common Hardware Reference Platform is described in detail in "PowerPC Microprocessor Common Reference Platform: A System Architecture," ISBN 1-55860-394-8, available from IBM.

In general, the CHRP employs a variety of sensors which detect and measure environmental conditions. If the measurements of these conditions exceed certain threshold values, then data reflecting the conditions is written into an environmental and power warning register ("EPOW" register) in the system. In the CHRP architecture, the data written into the EPOW register is referred to an "action code". However, the action code does not provide adequate information associated with the problem sources. For example, in the CHRP architecture, there are 7 defined action codes which can be written to the EPOW register. Action code 0 indicates the absence of an environmental fault condition. Action code 1 is a cooling system warning, action code 2 is a power warning, and action code 3 is a system shut down warning. Action code 4 is a system halt warning, which is similar to the system shutdown except that it is more critical and indicates that the system may shut down in 20 seconds. Action code 5 is an EPOW "main enclosure" warning which indicates the system may lose power within 4 milliseconds, and action code 7 is an EPOW power off indication.

While the above information provides some indication of the problem experienced by the system, it is insufficient from a diagnostic point of view. For example, action code 1 indicates the system is experiencing a cooling problem, however, it does not indicate which sensor provided the warning, what caused the warning, or the degree of severity of the problem. Therefore, customers may erroneously call the computer repair service for an error caused by site environmental problems. Also, the computer service personnel have difficulty isolating the root cause of the problem and may make incorrect or incomplete repairs. It is, therefore, one object of the present invention to provide an improved environmental and power warning system which addresses these difficulties. Additional objects and advantages of the present invention will become apparent in view of the following disclosure.

SUMMARY OF THE INVENTION

One aspect of the invention relates to an apparatus for detecting environmental faults in a computer system. In one embodiment, the apparatus comprises a means for measuring a physical parameter with a sensor coupled to the computer system, the sensor being associated with a sensor type and identification code; a means for transmitting a signal from the sensor to the computer system, the signal being responsive to the measurement; a means for determining whether an environmental fault condition exists by comparing the signal to a pre-determined threshold; means for determining an error type, an identification code and a sensor type; and a means for writing fault data to an environmental warning register, the fault data comprising the sensor type, identification code and error type.

In another aspect of the invention, the invention relates to a method for detecting environmental faults in a computer system. In one embodiment, the method comprises the steps of measuring a physical parameter with a sensor coupled to the computer system, the sensor being associated with a sensor type and identification code; transmitting a signal from the sensor to the computer system, the signal being responsive to the measurement; determining whether an environmental fault condition exists by comparing the signal to a pre-determined threshold; determining an error type, identification code and sensor type; writing fault data to an environmental warning register, the fault data comprising the sensor type, identification code and error type.

BRIEF DESCRIPTION OF DRAWINGS

FIGS. 5A–5B are a pseudo code example of an ELA routine according to an embodiment of the invention.

BRIEF DESCRIPTION OF EMBODIMENTS OF THE INVENTION

Figure 1:
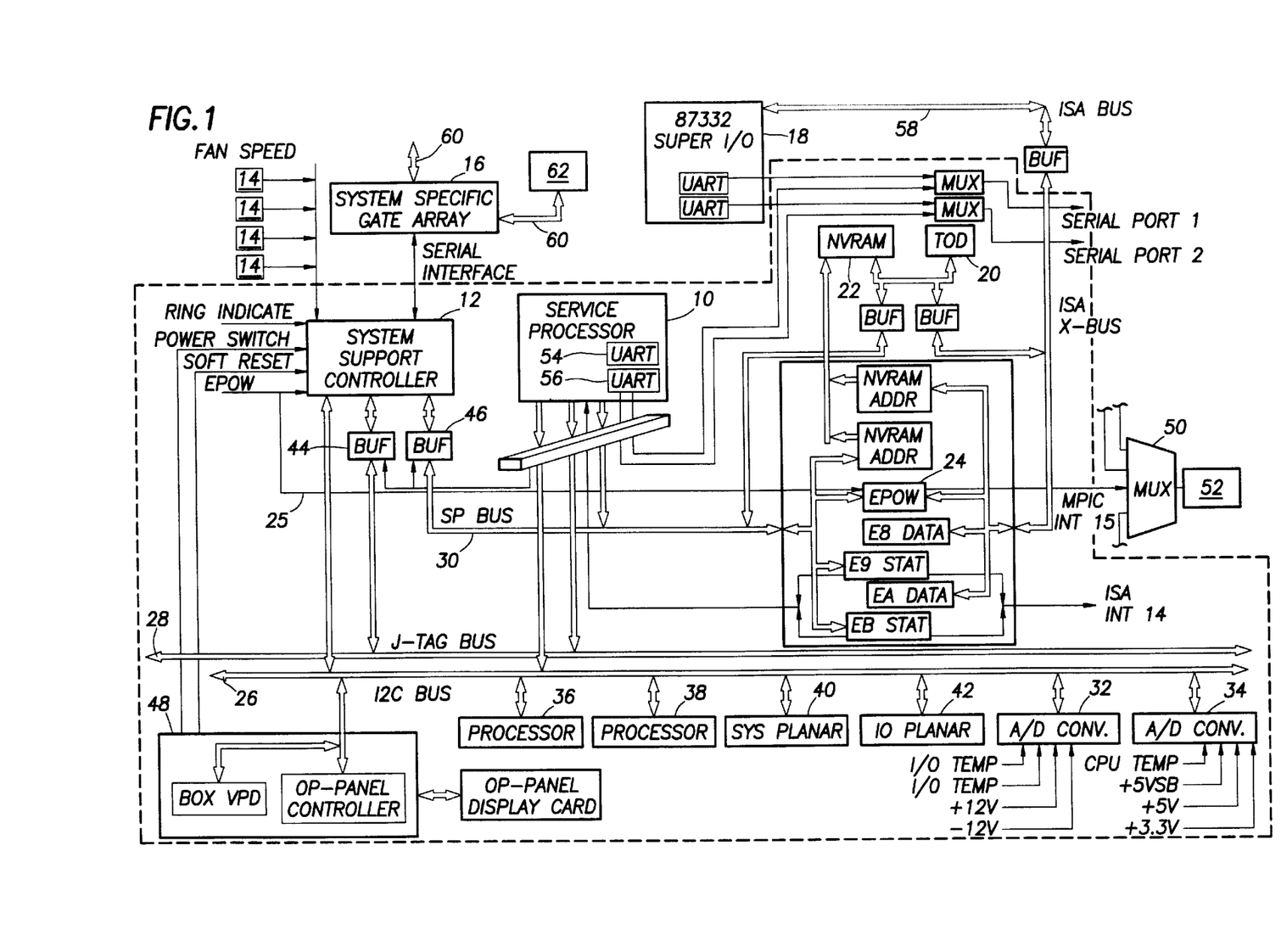
FIG. 1 is a block diagram of a processing system useful in accordance with one embodiment of the invention.

The present invention will be described with respect to embodiments adapted to the exemplary CHRP architecture. In other embodiments, the invention is readily adaptable to a wide variety of computer architectures as a matter of design choice. Referring now to FIG. 1, an embodiment of the invention will be described which provides error and event notification compliant with CHRP 1.0. FIG. 1 shows an apparatus useful for providing environmental and power warnings to a main processor according to an embodiment of the invention. In this embodiment, there is provided a service processor 10 ("SP"), having its own on board memory, and a system support controller 12 ("SSC"). SP 10 and SSC 12 are coupled to various other devices, such as system specific gate array 16, operator panel control card 48, I/O logic 18, RAM 22 and time of day logic 20. These resources are primarily to allow communication to other resources in the computer system. For example, gate array 16 allows communication to local buses 60 to access other resources, such as additional processors 62. I/O logic 18 accesses industry standard architecture ("ISA") bus 58 and passes data through serial ports 1 and 2. Serial ports 1 and 2 are multiplexed with UART's 54 and 56 on the service processor 10 to allow serial communication between service processor 10 and other devices coupled to the port. The operation of these additional resources is not critical to an understanding of the invention and they will not be described in further detail herein.

Environmental and power information for the system illustrated in FIG. 1 is provided through various sensors such as fan speed sensors 14 and temperature and voltage sensors coupled to analog to digital converters 32 and 34. The selection of actual sensors for use in the invention is not critical. Any sensors which are accurate over the allowable operating range of the computer system for temperature, voltage, etc., and which provide a suitable digital or an analog signal which may be digitized by suitable converters may be used. In the embodiment shown, the temperature and voltage sensors are placed at various physical locations in the computer system where they detect the temperature at various I/O locations, the CPU temperature, or various system voltage rails. After the signals transmitted from the sensors is converted to digital data by A/D converters 32 and 34, it is provided to the I$^2$C bus 26. A more detailed understanding of the I$^2$C bus operation is not critical to understanding the present invention. It will be noted that the I$^2$C bus also carries data from other system resources such as processors 36, 38, 40 and 42.

Data from fan speed sensors 14 is provided to system support controller 12 which then passes this data to the I$^2$C bus 26. Service processor 10 is coupled to the I$^2$C bus. Thus, all data provided by the sensors is available to service processor 10 by the I$^2$C bus. Service processor 10, as well as system support controller 12 is also coupled to the service processor bus 30. Service processor bus 30 allows access to EPOW register 24 as will be described in greater detail further herein.

EPOW register 24 is coupled to interrupt line 25 which, in this particular implementation, is referred to as MPIC interrupt 15. This interrupt line 25 is then passed to multiplexer 50 and finally to main processor 52. The interrupt transmitted over interrupt signal line 25 is sometimes referred to herein as an EPOW interrupt. All EPOW conditions are reported to the operating system of the main processor 52 via an EPOW interrupt. In one embodiment, the EPOW interrupt is generated by writing a non-zero value into EPOW register 24 as will be described in greater detail herein.

Figure 2:
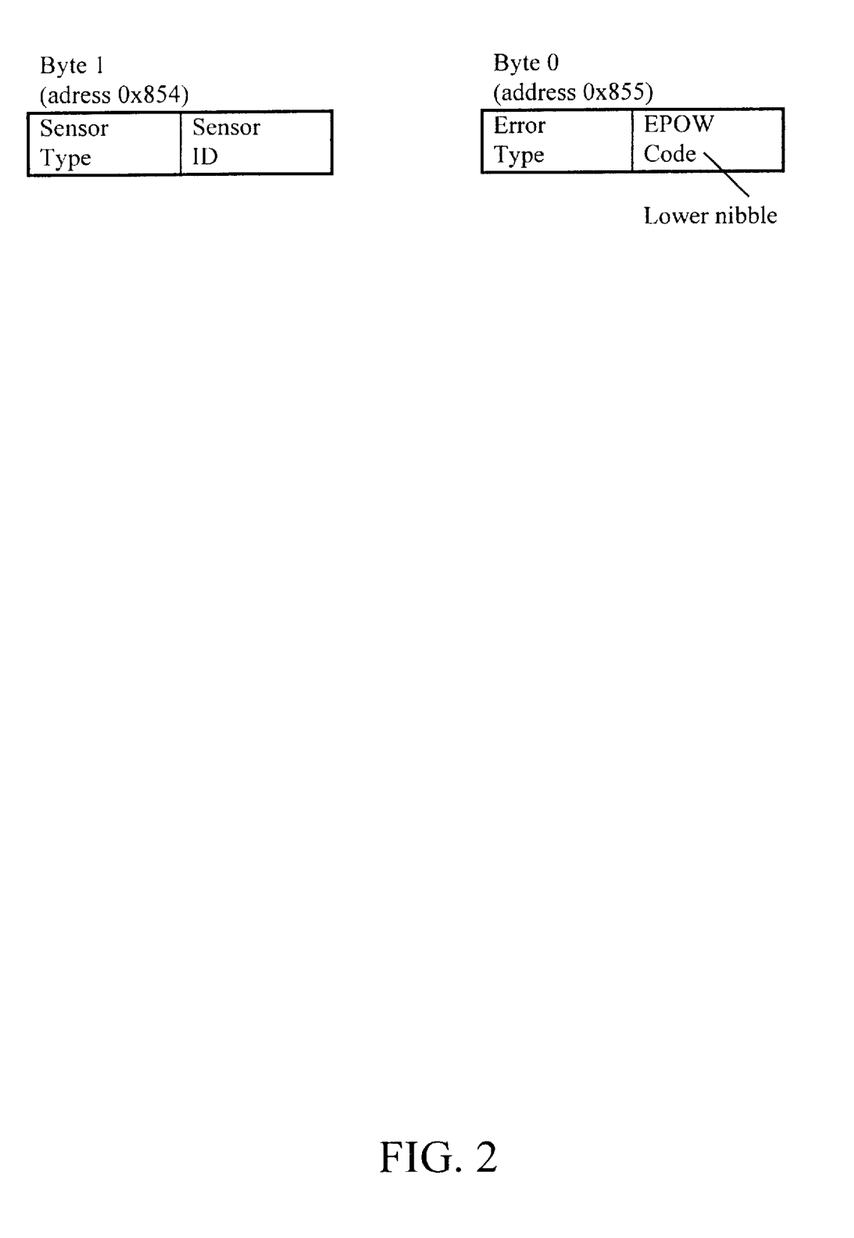
FIG. 2 is a diagram illustrating the contents of the EPOW register according to an embodiment of the invention.

FIG. 2 shows an example of an EPOW register according to an embodiment of the invention. The EPOW register comprises two bytes, byte 0 and byte 1. In the specific embodiment, byte 0 is located at ISA address 0×855 and byte 1 is located at 0x854. The lower nibble of ISA I/O address 0x855 register contains the EPOW action code at the time of the EPOW interrupt. The value is maintained until it is cleared by the interrupt handler executed by the main processor. A write to the lower nibble of this register with a non-zero value by the platform causes an EPOW interrupt to be issued to the main processor.

The upper nibble of EPOW byte 0 contains the error type. The lower nibble of EPOW byte 1 contains the environmental sensor identifier ("ID") code, and the upper nibble of contains the sensor type. In one specific embodiment, the definition of each field is as follows:

EPOW Code: Same as CHRP architected definition.

Error Type: A 4-bit hexadecimal value which identifies the cause of EPOW error condition. The values in this field are defined as follows:

0=Cause of error cannot be identified
1=Slow fan
2=Over temperature
3=Over voltage
4=Loss of AC power—power button moved to off position
5=Under voltage
6=Locked fan rotor
7=Maximum temperature exceeded
8=Loss of AC power from wall outlet
9-F=Reserved Sensor ID: A 4-bit hexadecimal value which identifies the specific instance of each sensor type within the platform.

Figure 3:
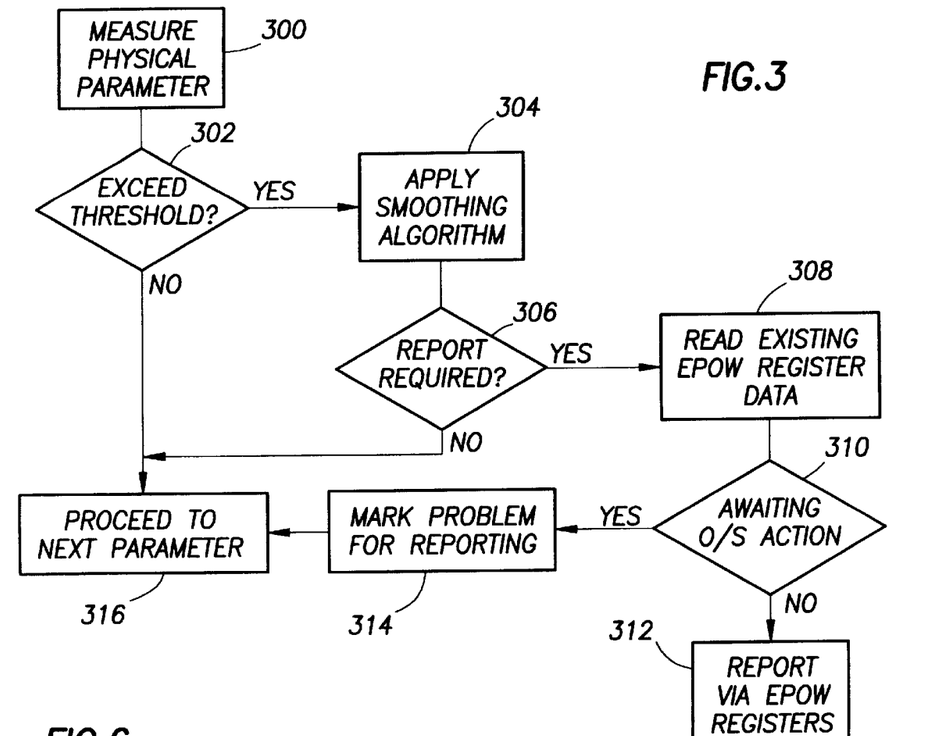
FIG. 3 is a flow chart for an environmental fault detection routine according to one embodiment of the invention.

Sensor Type: A 4-bit hexadecimal value which identifies the types of sensor in the platform. In this embodiment, the classifications are as follows:

0=Not Applicable or Undefined
1=Fan Speed Sensor
2=Voltage Sensor
3=Temperature Sensor
4-F=Reserved FIG. 3 is a flow chart illustrating the operation of the service processor 10 as it retrieves the data from the sensors on the I$^2$C bus 26. In step 300, the service processor 10 measures the physical parameter of an environmental condition of the computer system, such as a supply voltage, temperature, fan speed, etc., by retrieving the data for a particular sensor associated with the measurement from the I$^2$C bus 26. Next, service processor 10 proceeds to step 302 where it determines whether the physical parameter exceeds a predetermined threshold. In one embodiment, service processor 10 accesses a memory which stores acceptable limits for each physical parameter associated with each sensor.

In many instances, there will be more than one predetermined threshold for a particular measurement. For example, a temperature measurement may be provided with a maximum temperature, and a minimum temperature. Additionally, within the maximum and minimum range, there may be other ranges indicating the severity of the problem. For example, there may be two temperature limits associated with a temperature overage condition. When the first limit is reached the system may signal that the problem is only moderately bad and warn the user to take some action to improve system cooling. When the second limit is reached, the system may so inform the operator and cause a system shutdown before the temperature overage causes physical damage to the computer system, possibly resulting in a loss of important data stored in the system. Of course, the selection of such limits is a matter of design choice, and will be apparent to one of skill in the art in view of specific parameters which are system dependent.

If the measured value is within the predetermined threshold limits, then there is no environmental condition to report to the main processor and the service processor 10 proceeds to step 316 and selects the next sensor, or measurement parameter, from which to retrieve data. Flow then proceeds back to step 300 as before.

However, if in step 302 service processor 10 determines that the threshold is exceeded for a particular measurement, then it proceeds to step 304 where, in this embodiment, a smoothing algorithm is applied. The purpose of the smoothing algorithm is to prevent redundant reporting. Thus, the service processor 10 will wait in the event of multiple occurrences and will not report a particular problem if it has already been reported or if the measurement is wavering between good and bad values and would cause numerous, redundant errors. In other words, the values are written only once by service processor 10 when a specific platform environmental condition exceeds its design threshold. The service processor 10 writes a new EPOW value to the register 24 when: (1) the environmental condition, which was reported earlier, returned to normal then exceeds its design threshold again, (2) the environmental condition, which was reported earlier, exceeds the next critical level of design threshold, or (3) a new environmental condition exceeds its design threshold.

After the smoothing algorithm has been applied, service processor 10 then proceeds to step 306 to determine whether there is still a need to report the condition. If not, flow proceeds to step 316 as before. However, if the report is required, then service processor proceeds to step 308 and reads the existing value from the EPOW register.

In step 310, service processor 10 reviews the data retrieved from EPOW register to determine whether any error is currently awaiting action by the operating system of the main processor. In one embodiment, as will be described in greater detail herein, the operating system clears the EPOW register after reading the data contained there. Thus, in this embodiment, if the EPOW register is not empty, the system proceeds to step 314 where it marks the problem for reporting after a certain period of time. This prevents overwriting of an error currently being serviced. After the problem is marked, the flow proceeds to step 316 as before.

However, if in step 310 service processor 10 determines that the operating system is not aware of the problem, then it proceeds to step 312 where it reports the problem to the main processor 52 by writing data into the EPOW register 24 as described earlier. Once the EPOW register is written in step 312, an interrupt is generated on interrupt line 25 and passed to the main processor 52 via multiplexer 50. The handling of the EPOW interrupt by the main processor 52 is described in greater detail herein.

Numerous ways for handling interrupts will occur to those of skill in the art. However, for purposes of illustration, one version of the invention will be described which performs interrupt handling according to the CHRP architecture described earlier. In this embodiment, an operating system, for example AIX, is running on the main processor 52. Addresses to the interrupt handling routines are provided to the operating system. The actual interrupt handling routines are stored in firmware on the system. These routines are stored as part of the run time abstraction service ("RTAS") which is defined by the CHRP architecture. When the main processor 52 receives an EPOW interrupt, it calls the RTAS routines to perform the required handling.

Figure 4:
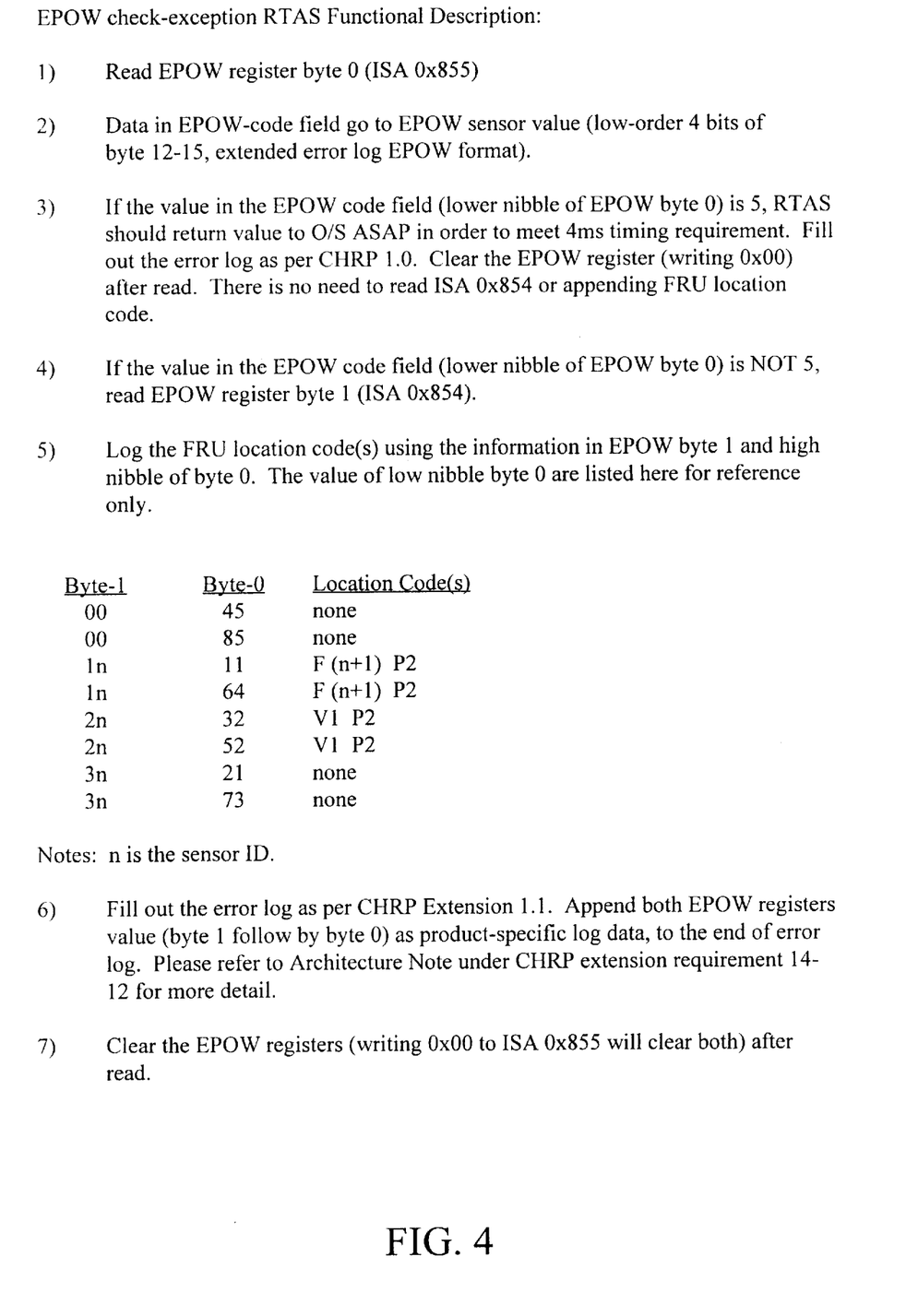
FIG. 4 is a pseudo code example of an RTAS function according to an embodiment of the invention.

In one specific embodiment, the RTAS comprises a routine shown in pseudo code in FIG. 4. This is referred to as the "check-exception" routine which also performs a read of the EPOW register byte 0 and, if required, EPOW register byte 1.

When the RTAS functional routine is called by the operating system, in general, the flow is as follows. First, EPOW register byte 0 is read. This data represents the EPOW action code. The EPOW action code and the data in byte 1 is placed in an error log by the operating system error log facility. The operating system then invokes an error log analysis ("ELA") routine which analyzes the cause, or causes, of the EPOW condition based on the extended error information in the error log. Pseudo code for the ELA routine is shown in FIGS. 5A–5B.

Referring again to FIG. 4, if the value in the EPOW code field, i.e., lower nibble of EPOW byte 0, is 5, then the RTAS returns that value to the operating system quickly in order to meet the 4 millisecond timing requirement specified in the CHRP architecture.

More specifically, referring again to FIG. 1, Class 5 action codes for "AC power loss" and "Power-off switch" are coupled directly from the detection source to the main processor 52. These are urgent power-off warnings that do not allow time for service processor 10 action.

All other action codes are written by the service processor 10 to the EPOW register 24 as result of conditions detected by polling the environmental sensors. The service processor 10 reads the contents of the EPOW register 24 before writing new data to assure that data is not lost or that higher priority codes are not overwritten by lower priority codes.

Figure 6:
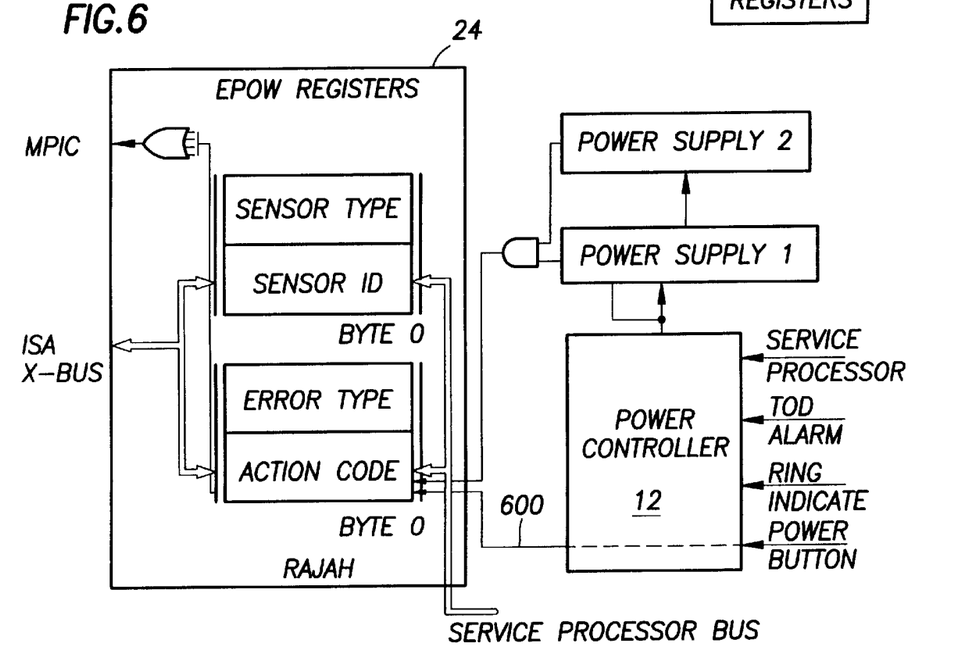
FIG. 6 is a block diagram illustrating the operation of an EPOW interrupt according to an embodiment of the invention.

FIG. 6 illustrates the operation of class 5 action codes in even greater detail. Specifically, system controller 12 receives various signals from other resources related to power events in the system. For these types of signals, SSC 12 does not write data to I²C bus 26, shown in FIG. 1, to be later read by service processor 10. Rather, SSC 12 is coupled directly to the EPOW registers 24 via signal line 600. Of course, as discussed earlier, once data is written into the EPOW register 24, an interrupt to the main processor 52 is generated.

In a further embodiment, the EPOW action code 5 is written to the register by the power controller hardware. If this environmental condition persists, power controller hardware will maintain the value and a 0x00 write to the register 24 will not clear it. This register will be cleared only when the environmental condition has returned to normal and a 0x00 is written later by another RTAS function.

Figure 7:
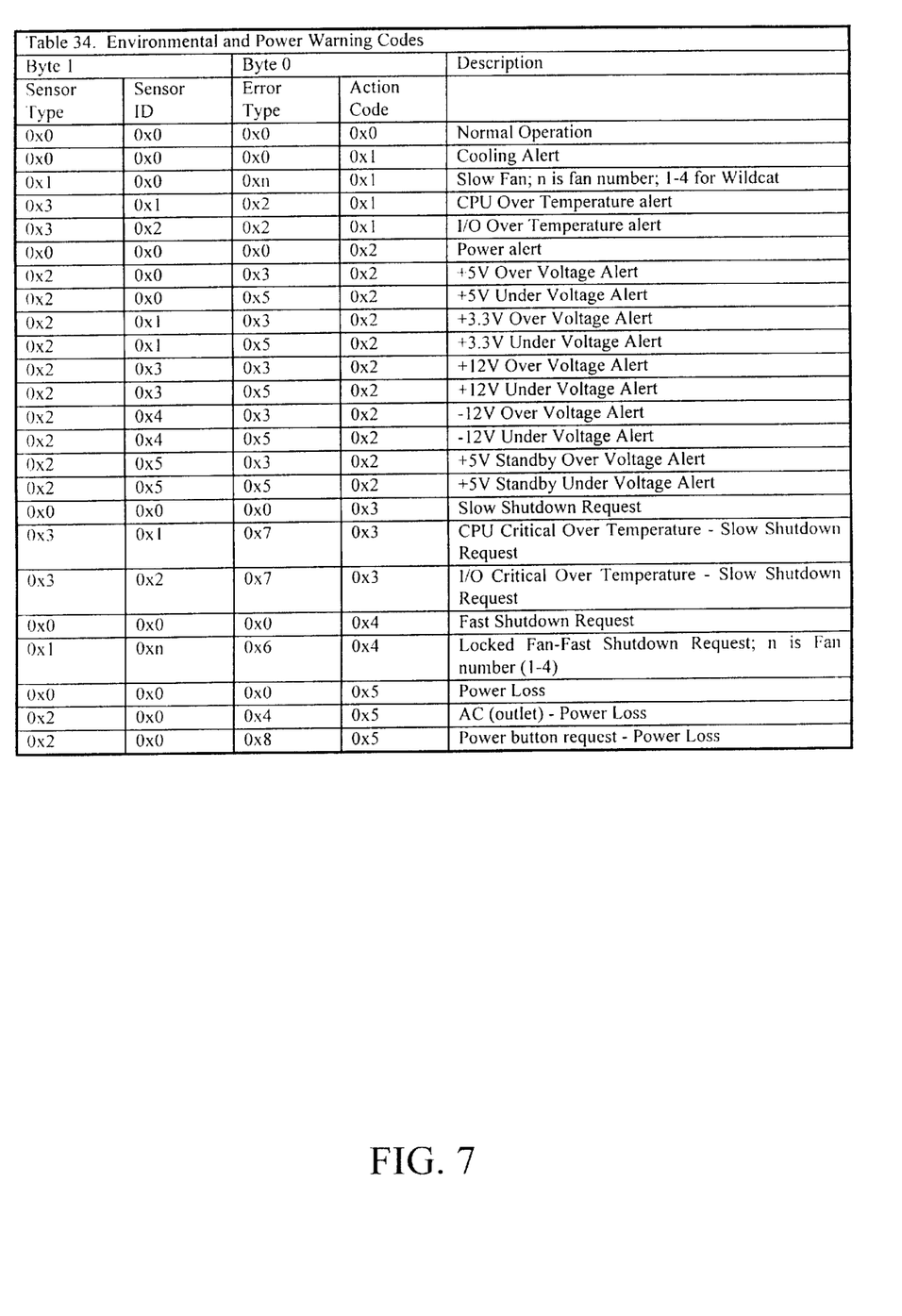
FIG. 7 is a table illustrating possible EPOW codes according to still a further embodiment of the invention.

If the value in the EPOW code field is not 5, then the RTAS reads the EPOW register byte 1 (ISA 0x854). FIG. 7 is a table illustrating choices of sensor types, sensor ID's, error types and action codes according to one embodiment of the invention. Once these values are read by the RTAS they are then passed to the operating system for logging. The pseudo code shown in FIGS. 5A–5B illustrates a specific example. After the operating system responds to the interrupt, the RTAS is invoked to retrieve the requisite data from the EPOW register and create an error log in memory. The error log includes a predetermined number of bytes which are provided with various information used by the operating system. Error log byte 15 is provided with information to inform the ELA routine of the nature of the error. After the error log is created by the operating system, the ELA routine is invoked. The ELA then reviews error log byte 15 and performs the appropriate action. For example, if the error log byte 15 contains a 1, the main processor reads the EPOW error definition from a table which has been provided with data related to the EPOW registers. If the EPOW error definition is 0x1n11, where n is the sensor identification code, then the ELA displays a warning message to the system console indicating that a cooling problem has been detected. The message also specifies the fan which appears to be causing the problem, and the exact nature of the problem itself, e.g., the fan is rotating slower than expected. Of course, there are numerous other ways in which the environmental condition can be reported, such as generating an e-mail to a system operator mailbox, or a paper printout.

Finally, the EPOW registers are cleared by the RTAS by writing a 0 to ISA 0x855. In the present embodiment, this will clear both bytes of the EPOW register. The service processor 10 then continues to poll the sensors and write new data to the EPOW register in the event an environmental condition is detected, as described in detail above.

Although the present invention has been described according to specific embodiments involving the CHRP architecture, it will be understood by those of skill in the art that the invention admits to numerous other embodiments involving other architectures which may be substituted for the CHRP architecture as a matter of design choice. Thus, the above embodiments are not intended to be limitative, for various changes in form and detail are considered to be within the scope and spirit of the present invention. All publications referenced herein are hereby incorporated by reference as though set forth in full.

What is claimed is:

1. An apparatus for detecting environmental faults in a computer system containing at least one processor, the apparatus comprising:

means for measuring a physical parameter with a sensor coupled to the computer system, the sensor associated with a sensor type and identification code;

a service processor running concurrently with the processor for transmitting a signal from the sensor to the computer system, the signal being responsive to the measurement;

means for determining whether an environmental fault condition exists by comparing the signal to a pre-determined threshold;

means for determining an error type, an identification code and a sensor type;

means for writing fault data to an environmental warning register, the fault data comprising the sensor type, identification code and error type.

2. An apparatus as in claim 1 wherein the signal from the sensor comprises a digitized sensor value representative of the measurement.

3. An apparatus as in claim 2 wherein the service processor retrieves the sensor value from a data bus.

4. An apparatus as in claim 3 wherein the means for determining whether an environmental fault condition exists comprises a memory which stores data representing a warning threshold for the sensor value, the memory being accessible by the service processor which compares the sensor value to the data representing the warning threshold.

5. An apparatus as in claim 3 wherein the means for determining a sensor type comprises a memory which stores data representing a classification for a sensor which is indicating a fault condition, the memory being accessible by the service processor.

6. An apparatus as in claim 3 wherein the means for determining an error type comprises a memory which stores data representing a cause of the fault condition, the memory being accessible by the service processor which determines the classification in response to the sensor value.

7. An apparatus as in claim 1 wherein the means for writing the fault data to an environmental warning register comprises a service processor which retrieves the sensor type, identification code and error type from a memory if an environmental fault condition exists.

8. An apparatus as in claim 1 further comprising means for generating a signal to a main processor if an environmental fault condition exists.

9. An apparatus as in claim 8 wherein the means for generating a signal to a main processor comprises a service processor which writes to the environmental warning register, whereby an interrupt to the main processor is generated.

10. A method for detecting environmental faults in a computer system containing at least one processor, the apparatus comprising:

measuring a physical parameter with a sensor coupled to the computer system, the sensor associated with a sensor type and identification code;

transmitting a signal from the sensor to the computer system with a service processor running concurrently with the processor, the signal being responsive to the measurement;

determining whether an environmental fault condition exists by comparing the signal to a pre-determined threshold;

determining an error type, an identification code and a sensor type;

writing fault data to an environmental warning register, the fault data comprising the sensor type, identification code and error type.

11. A method as in claim 10 wherein the signal from the sensor comprises a digitized sensor value representative of the measurement.

12. The method as in claim 10 wherein the means for transmitting a signal from the sensor comprises retrieving the sensor value from a data bus with the service processor.

13. A method as in claim 12 wherein the step of determining whether an environmental fault condition exists comprises retrieving data representing a warning threshold for the sensor value from a memory, the memory being accessible by the service processor which compares the sensor value to the data representing the warning threshold.

14. A method as in claim 12 wherein the step of determining a sensor type comprises retrieving data from memory which represents the classification of a sensor which is indicating a fault condition, the memory being accessible by the service processor.

15. A method as in claim 12 wherein the step of determining an error type comprises retrieving data from memory which represents a classification of the fault condition, the memory being accessible the service processor which determines the classification in response to the sensor value.

16. A method as in claim 10 wherein the step of writing the fault data to an environmental warning register comprises retrieving the sensor type, identification code and error type from a memory if an environmental fault condition exists.

17. A method as in claim 10 further comprising the step of generating a signal to a main processor if an environmental fault condition exists.

18. A method as in claim 17 wherein the step of generating a signal to a main processor comprises writing to the environmental warning register from the service processor, whereby an interrupt to the main processor is generated.

* * * * *